(12) United States Patent
Hagen et al.

(10) Patent No.: US 11,254,608 B2
(45) Date of Patent: Feb. 22, 2022

(54) ARTICLE COMPRISING A PROTECTIVE TOP LAYER BASED ON MIXED OXIDE OF ZIRCONIUM AND ALUMINUM

(71) Applicant: SAINT-GOBAIN GLASS FRANCE, Courbevoie (FR)

(72) Inventors: Jan Hagen, Bonn (DE); Laura Jane Singh, Paris (FR); Alessandro Benedetto, Paris (FR); Frédéric Barrieres, Saint-Ouen (FR); Benoît Louis, Saint-Denis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 841 days.

(21) Appl. No.: 16/078,939

(22) PCT Filed: Feb. 23, 2017

(86) PCT No.: PCT/FR2017/050402
§ 371 (c)(1),
(2) Date: Aug. 22, 2018

(87) PCT Pub. No.: WO2017/144822
PCT Pub. Date: Aug. 31, 2017

(65) Prior Publication Data
US 2019/0055157 A1    Feb. 21, 2019

(30) Foreign Application Priority Data

Feb. 23, 2016   (FR) ........................ 1651466

(51) Int. Cl.
*C03C 17/245* (2006.01)
*B32B 33/00* (2006.01)
(Continued)

(52) U.S. Cl.
CPC ............ *C03C 17/245* (2013.01); *B32B 33/00* (2013.01); *B32B 37/24* (2013.01);
(Continued)

(58) Field of Classification Search
None
See application file for complete search history.

(56) References Cited

U.S. PATENT DOCUMENTS

2005/0069717 A1* 3/2005 Stachowiak ...... B32B 17/10174
428/432
2009/0297703 A1* 12/2009 Li ...................... C03C 17/3417
427/163.3
(Continued)

FOREIGN PATENT DOCUMENTS

| GB | 1113133 A1 * | 5/1968 |
| JP | 60079608 A1 * | 7/1986 |
| WO | WO 2015/185849 A1 | 12/2015 |

OTHER PUBLICATIONS

International Search Report as issued in International Patent Application No. PCT/FR2017/050402, dated May 12, 2017.

*Primary Examiner* — David Sample
(74) *Attorney, Agent, or Firm* — Pilsbury Winthrop Shaw Pittman LLP

(57) ABSTRACT

An article includes a substrate that is transparent, the substrate being covered on at least one of its faces, totally or partly, with a protective layer based on zirconium and aluminum mixed oxide.

21 Claims, 3 Drawing Sheets

(51) Int. Cl.
*B32B 37/24* (2006.01)
*B32B 38/00* (2006.01)
*C03C 17/36* (2006.01)

(52) U.S. Cl.
CPC .......... *B32B 38/0008* (2013.01); *C03C 17/36* (2013.01); *C03C 17/366* (2013.01); *C03C 17/3626* (2013.01); *C03C 17/3644* (2013.01); *B32B 2037/243* (2013.01); *B32B 2037/246* (2013.01); *B32B 2255/20* (2013.01); *B32B 2307/584* (2013.01); *B32B 2307/71* (2013.01); *B32B 2551/00* (2013.01); *C03C 2217/23* (2013.01); *C03C 2217/256* (2013.01); *C03C 2218/156* (2013.01); *C03C 2218/1525* (2013.01); *C03C 2218/32* (2013.01)

(56) References Cited

U.S. PATENT DOCUMENTS

| | | | |
|---|---|---|---|
| 2012/0027968 A1* | 2/2012 | Chang | C23C 14/0036 |
| | | | 428/34.1 |
| 2012/0164420 A1* | 6/2012 | Lemmer | F25D 21/04 |
| | | | 428/216 |
| 2014/0220360 A1 | 8/2014 | Wang et al. | |
| 2016/0090646 A1* | 3/2016 | Chen | C23C 14/022 |
| | | | 428/336 |

* cited by examiner

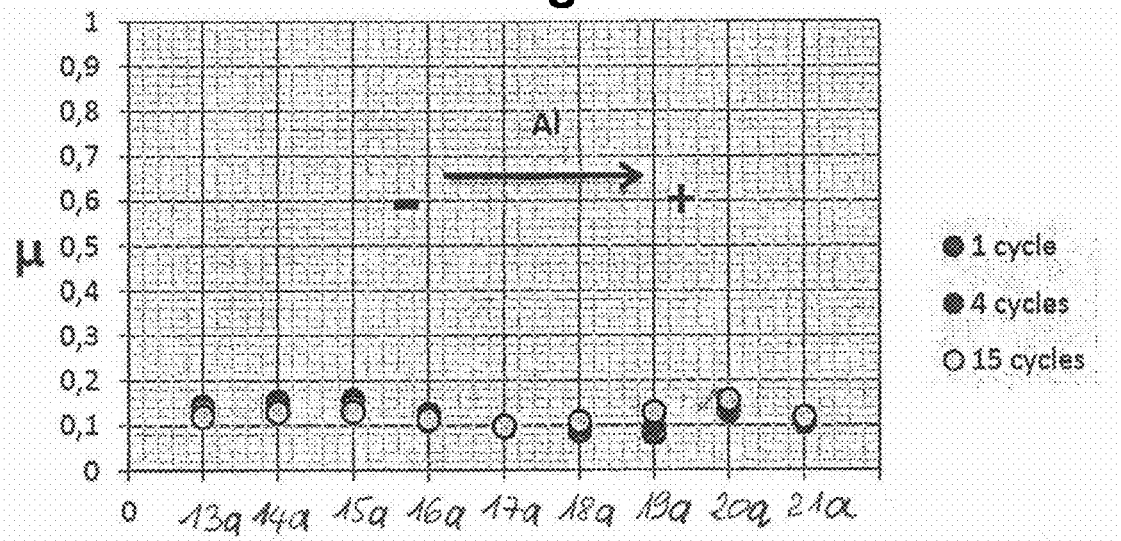
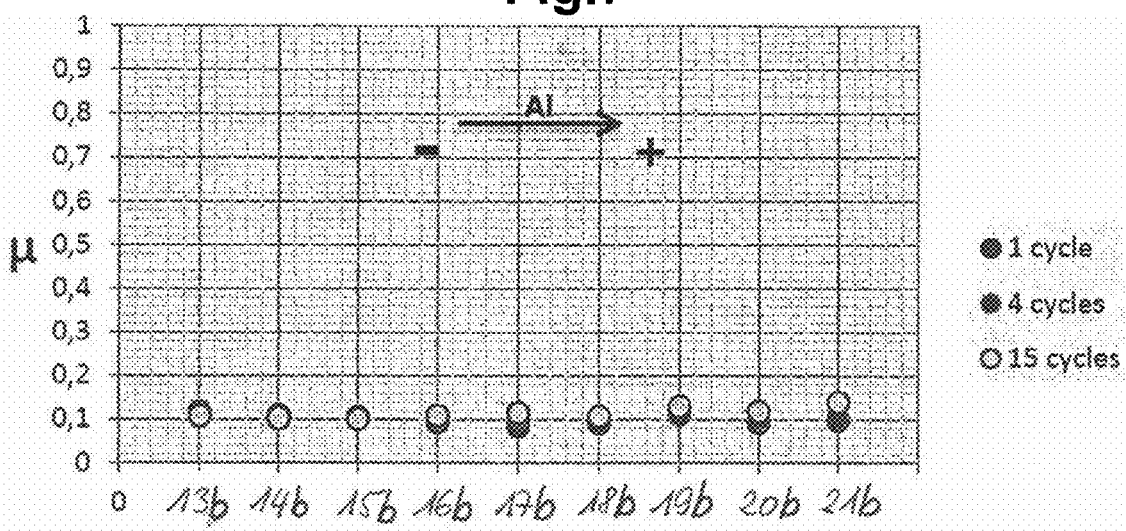

ARTICLE COMPRISING A PROTECTIVE TOP LAYER BASED ON MIXED OXIDE OF ZIRCONIUM AND ALUMINUM

CROSS-REFERENCE TO RELATED APPLICATIONS

This application is the U.S. National Stage of PCT/FR2017/050402 filed Feb. 23, 2017, which in turn claims priority to French patent application number 1651466 filed Feb. 23, 2016. The content of these applications are incorporated herein by reference in their entireties.

The invention relates to the field of thin inorganic layers, especially deposited on substrates. The substrate may be made of glass, polymer, metal or ceramic, but is advantageously made of glass.

The invention more particularly relates to an article comprising a substrate covered with a thin transparent protective layer, in particular a layer of hard material giving said substrate great scratch resistance, a low coefficient of friction and high thermal stability.

The invention is also directed toward the process for manufacturing such an article and also to the use thereof in numerous applications, in particular in the field of interior decoration, but also in the field of glazing for buildings or in the field of glazing for vehicles.

Glass surfaces have a high coefficient of friction and are not very scratch resistant, with the exception of toughened glass surfaces, in particular chemically toughened glass. However, such a treatment entails an additional cost in the manufacturing process. Alternatives are thus to be sought.

Articles intended to act on infrared radiation are used in "solar control" glazings directed toward reducing the amount of entering solar energy and/or in "low-emissivity" glazings directed toward reducing the amount of energy dissipated out of a building or a vehicle. Such articles comprise at least one substrate coated with a stack of thin layers acting on infrared radiation, comprising at least one functional layer. A functional layer is deposited between at least two layers based on dielectric materials.

The mechanical strength of these stacks is often insufficient, all the less so when the functional layer is a silver-based metal layer (or silver layer). This low strength is reflected in the short term by the appearance of defects such as scratches, or even total or partial detachment of the stack during its use under normal conditions. All defects or scratches are liable to impair not only the esthetic appearance of the coated substrate, but also its optical and energetic performance qualities.

US 2014/0220360 thus describes a process for manufacturing a scratch-resistant coated article comprising a heat treatment step. After this heat treatment, the article coated with a layer of zirconium oxide and/or nitride, doped with copper, in particular copper oxide, proves to be scratch-resistant. However, it has been discovered that the coating disclosed in said document shows reduced scratch resistance without this heat treatment.

Now, for a certain number of applications, it is useful to be able to have a glass substrate that has optimum scratch resistance without it being necessary, however, to make it undergo a heat treatment, for instance thermal toughening.

There is thus a need for resistant coatings, with a low coefficient of friction, which allow surface protection of toughenable articles, i.e. articles which may or may not be intended to be toughened, with respect to scratches, without this scratch resistance being dependent on any additional treatment, and all the less so on a heat treatment, for example of toughening type.

Contrary to all expectation, it turns out that a coating of zirconium and aluminum mixed oxide efficiently protects an article thus coated against scratches, and does so without it being necessary for said coated article to undergo any additional treatment, for instance toughening or bending, to increase its scratch-resistance properties, contrary to the prior art mentioned previously.

In addition, another advantage of the zirconium and aluminum mixed oxide is its transparency, which is a quality that copper-doped zirconium oxide does not have.

One subject of the invention is thus an article comprising a substrate that is especially transparent, said substrate being covered on at least one of its faces, totally or partly, with a protective layer based on zirconium and aluminum mixed oxide. The article may also comprise a coating located between the protective layer based on zirconium and aluminum mixed oxide and said substrate. The protective layer is preferably the outermost layer of the stack covering said substrate, i.e. the layer that is the most remote from the substrate.

The invention also relates to an article, such as a glazing, comprising a substrate, which is preferably transparent, coated with a stack of thin layers acting on infrared radiation, comprising at least one functional layer and at least one protective layer based on zirconium and aluminum mixed oxide. The functional layer may act on solar radiation and/or on infrared radiation of long wavelength.

The functional layers are deposited between coatings based on dielectric materials which generally comprise several dielectric layers making it possible to adjust the optical properties of the stack.

The protective layer is deposited over at least part of the functional layer. Preferably, the protective layer is the last layer of the stack.

The invention thus consists in preventing, besides scratches, modification of the properties of the stack, especially the optical and thermal properties, in the case where the carrier substrate is subjected to a heat treatment such as bending or toughening.

The article according to the invention may be bent or non-bent and/or toughened or non-toughened. It is then said to be toughenable and/or bendable.

The invention also relates to glazing, in particular glazing for a vehicle or glazing for a building, or glazing included in the composition of a table, a counter, a cooking hob, a shower wall, a partition or a radiator, comprising such a toughenable and/or bendable article.

For the purposes of the present invention, the term "toughenable" refers to an article which may or may not be toughened for the purpose of its use. Toughening is an optional step that is not necessary for the use of the article or for its scratch-resistance properties.

For the purposes of the present invention, the term "bendable" refers to an article which may or may not be bent for the purpose of its use. Bending is an optional step.

These glazings may equip buildings just as well as vehicles, for the purpose especially of reducing the air-conditioning work and/or to reduce excessive overheating entailed by the ever-increasing magnitude of glazed surfaces in rooms and driving compartments or for safety reasons.

Finally, the invention relates to a process for manufacturing such an article, in which said protective layer based on zirconium and aluminum mixed oxide is deposited:

(i) by magnetron cathode sputtering, in particular by co-sputtering of zirconium oxide and aluminum oxide or by reactive sputtering using a target of zirconium and aluminum in the presence of $O_2$, or a mixed target of zirconium and aluminum oxide, or
(ii) by chemical vapor deposition using a suitable precursor based on zirconium and aluminum, or
(iii) by gas-phase pyrolysis under ambient pressure.

All the luminous characteristics presented in the present description are obtained according to the principles and methods described in European standard EN 410 relating to the determination of the luminous and solar characteristics of glazings used in construction glass.

The stack is deposited by magnetic-field-assisted cathode sputtering (magnetron process). According to this advantageous embodiment, all the layers of the stack are deposited by magnetic-field-assisted cathode sputtering.

Unless otherwise mentioned, the thicknesses mentioned in the present document are physical thicknesses and the layers are thin layers. The term "thin layer" means a layer with a thickness of between 0.1 nm and 100 micrometers.

Throughout the description, the substrate according to the invention is considered posed horizontally. The stack of thin layers is deposited over the substrate. The sense of the terms "over" and "under" and "lower" and "upper" is to be considered relative to this orientation. Unless specifically stipulated, the terms "over" and "under" do not necessarily mean that two layers and/or coatings are arranged in contact with each other. When it is stated that a layer is deposited "in contact" with another layer or a coating, this means that there cannot be one or more layers intercalated between these two layers.

The term "zirconium and aluminum mixed oxide" covers not only zirconium oxide doped with aluminum metal, but also aluminum oxide doped with zirconium or zirconium oxide doped with a material comprising aluminum such as aluminum oxide or alumina, or aluminum oxide or alumina doped with zirconium oxide. Advantageously, the protective layer is based on zirconium oxide doped with aluminum oxide.

The zirconium and aluminum mixed oxide may be pure or may have traces of other elements such as traces of titanium, hafnium or silicon. When traces are present, they are advantageously <1% by weight relative to the total weight of zirconium and aluminum mixed oxide.

The atomic proportions of aluminum and zirconium in the protective layer relative to the proportions of all the elements other than oxygen and nitrogen present in the protective layer are, in order of increasing preference, greater than 50%, greater than 60%, greater than 70%, greater than 80%, greater than 90%, greater than 95%, greater than 96%, greater than 97%, greater than 98%, greater than 99%.

The Al/Zr atomic ratio in the zirconium and aluminum mixed oxide is, in order of increasing preference:
  greater than 0.05, greater than 0.06, greater than 0.08, greater than 0.10, greater than 0.12, greater than 0.14, greater than 0.16, greater than 0.18, greater than 0.20, and/or
  less than 0.50, less than 0.45, less than 0.42, less than 0.40, less than 0.38, less than 0.36, less than 0.34, less than 0.32, less than 0.30.

The Al/Zr atomic ratio in the zirconium and aluminum mixed oxide is between 0.05 and 0.5, advantageously between 0.1 and 0.4, even more advantageously between 0.2 and 0.3.

The mass proportions of aluminum and zirconium in the protective layer relative to the mass proportions of all the elements other than oxygen and nitrogen present in the protective layer are, in order of increasing preference, greater than 50%, greater than 60%, greater than 70%, greater than 80%, greater than 90%, greater than 95%, greater than 96%, greater than 97%, greater than 98%, greater than 99%.

The mass proportions of aluminum in the protective layer relative to the mass proportions of all the elements other than oxygen and nitrogen present in the protective layer are:
  greater than 5%, greater than 10%, greater than 20%, greater than 30%, greater than 40%, greater than 50%, and/or
  less than 80%, less than 60%, less than 50%, less than 40%, less than 30%, less than 20%.

The mass proportions of zirconium in the protective layer relative to the mass proportions of all the elements other than oxygen and nitrogen present in the protective layer are:
  greater than 10%, greater than 20%, greater than 40%, greater than 50%, greater than 60%, greater than 70%, greater than 80%, and/or
  less than 90%, less than 80%, less than 70%, less than 60%, less than 50%.

The Al/Zr mass ratio in the zirconium and aluminum mixed oxide is, in order of increasing preference:
  greater than 0.05, greater than 0.06, greater than 0.08, greater than 0.10, greater than 0.11, greater than 0.12, greater than 0.13, greater than 0.14, greater than 0.15, and/or
  less than 3.00, less than 2.80, less than 2.60, less than 2.40, less than 2.20, less than 2.00, less than 1.80, less than 1.60, less than 1.5.

The Al/Zr mass ratio in the zirconium and aluminum mixed oxide is between 0.05 and 3, advantageously between 0.1 and 2, even more advantageously between 0.15 and 1.5.

The measurements of the atomic ratio and the mass ratio are taken using a scanning electron microscope via the EDX method.

The thickness of the protective layer is, in order of increasing preference:
  less than or equal to 100 nm, less than or equal to 50 nm or less than or equal to 35 nm, and/or
  greater than or equal to 2 nm, greater than or equal to 3 nm, greater than or equal to 5 nm, greater than or equal to 10 nm, greater than or equal to 15 nm.

The thickness of the protective layer is, in order of increasing preference, between 1 and 100 nm, between 2 and 50 nm, between 5 and 35 nm.

The functional layer is chosen from:
a metallic functional layer based on silver or a metal alloy containing silver,
a metallic functional layer based on niobium,
a functional layer based on niobium nitride.

The functional layers are preferably silver-based metallic functional layers.

A silver-based metallic functional layer comprises at least 95.0%, preferably at least 96.5% and better still at least 98.0% by mass of silver relative to the mass of the functional layer. Preferably, the silver-based functional metal layer comprises less than 1.0% by mass of metals other than silver relative to the mass of the silver-based functional metal layer.

The thickness of the silver-based functional layers is, in order of increasing preference, from 5 to 20 nm, from 8 to 15 nm.

The silver layers are deposited between coatings based on dielectric materials which generally comprise several dielectric layers making it possible to adjust the optical properties of the stack. These dielectric layers also make it possible to protect the silver layer against chemical or mechanical attack. The stack of thin layers thus advantageously comprises at least one silver-based functional metal layer, at least two coatings based on dielectric materials, each coating comprising at least one dielectric layer, such that each functional metal layer is arranged between two coatings based on dielectric materials.

The coatings based on dielectric materials have a thickness of greater than 15 nm, preferably between 15 and 50 nm and better still from 30 to 40 nm.

The dielectric layers of the coatings based on dielectric materials have the following characteristics, alone or in combination:
- they are deposited by magnetic-field-assisted cathode sputtering,
- they are chosen from barrier dielectric layers referred to hereinbelow as "barrier layer" or stabilizing layer,
- they are chosen from oxides or nitrides of one or more elements chosen from titanium, silicon, aluminum, tin and zinc,
- they have a thickness of greater than 5 nm, preferably between 8 and 35 nm.

The term "barrier layer" means a layer made of a material that is capable of acting as a barrier to the diffusion of oxygen and water at high temperature, originating from the ambient atmosphere or from the transparent substrate, to the functional layer.

The material constituting the intermediate barrier layer is chosen from oxides, nitrides, carbides and mixtures thereof, preferably at least one element chosen from the group comprising silicon, aluminum, tin, titanium, zirconium, hafnium, niobium, tantalum and chromium.

The barrier dielectric layers may be based on silicon and/or aluminum compounds chosen from oxides such as $SiO_2$, nitrides such as silicon nitride $Si_3N_4$ and aluminum nitrides AlN, and oxynitrides $SiO_xN_y$, silicon oxycarbide $SiO_xC_y$, silicon carbide SiC, optionally doped with at least one other element. The barrier dielectric layers may also be based on zinc tin oxide or tin oxide $SnO_2$, chromium carbide CrC, tantalum carbide TaC, titanium carbide TiC, zirconium carbide ZrC, chromium nitride CrN, tantalum nitride TaN, titanium nitride TiN and zirconium nitride ZrN.

The thickness of said barrier layer is between 5 and 100 nm, advantageously between 10 and 50 nm. The thickness of said barrier layer is at least 10 nanometers and preferably at least 20 nanometers.

The term "stabilizing dielectric layer" means a layer made of a material that is capable of stabilizing the interface between the functional layer and this layer. The stabilizing dielectric layers are preferably based on crystalline oxide, especially based on zinc oxide, optionally doped with at least one other element, such as aluminum. The stabilizing dielectric layer(s) are preferably zinc oxide layers.

The stabilizing dielectric layer(s) may be over and/or under at least one silver-based functional metal layer or each silver-based functional metal layer, either directly in contact therewith or separated by a blocking layer. A stabilizing layer located under a functional layer is also referred to as a "wetting layer".

The wetting layer may be made of a dielectric material (i) chosen from oxides, nitrides, carbides, oxynitrides and oxycarbides of at least one element chosen from the group comprising silicon, aluminum, tin, titanium, zirconium, hafnium, niobium, tantalum, zinc and chromium and being (ii) different from the material constituting said intermediate barrier layer. The dielectric material constituting said wetting layer is chosen from titanium oxide, silicon oxide, silicon nitride, zinc oxide and zinc tin oxide. The thickness of the wetting layer is between 5 and 100 nm, advantageously between 5 and 20 nm and even more advantageously between 5 and 10 nm.

The protective layer is preferably the last layer of the stack, i.e. the layer that is the most remote from the substrate coated with the stack.

The stacks may also comprise blocking layers whose function is to protect the functional layers by preventing any degradation associated with the deposition of a coating based on dielectric materials or associated with a heat treatment. According to one embodiment, the stack comprises at least one blocking layer located under and in contact with a silver-based functional metal layer and/or at least one blocking layer located over and in contact with a silver-based functional metal layer.

Among the blocking layers conventionally used in particular when the functional layer is a silver-based metal layer, mention may be made of blocking layers based on a metal chosen from niobium Nb, tantalum Ta, titanium Ti, chromium Cr and nickel Ni or based on an alloy obtained from at least two of these metals, especially an alloy of nickel and chromium (NiCr).

The thickness of each blocking overlayer or underlayer is preferably:
- at least 0.5 nm or at least 0.8 nm and/or
- not more than 5.0 nm or not more than 2.0 nm.

An example of a stack that is suitable for use according to the invention comprises:
- a coating based on dielectric materials located under the silver-based functional metal layer, the coating possibly comprising at least one dielectric layer based on silicon nitride and/or aluminum nitride,
- optionally a blocking layer,
- a silver-based functional metal layer,
- optionally a blocking layer,
- a coating based on dielectric materials located over the silver-based functional metal layer, the coating possibly comprising at least one dielectric layer based on silicon nitride and/or aluminum nitride,
- a protective layer.

The article, i.e. the transparent substrate optionally coated with the stack, is not heat treated, but it may be intended to undergo a high-temperature heat treatment chosen from annealing, for example flash annealing such as laser or flame annealing, toughening and/or bending. The temperature of the heat treatment is greater than 400° C., preferably greater than 450° C. and better still greater than 500° C. The implementation or otherwise of a heat treatment on the article according to the invention will depend on the application for which the article is intended. The properties of the article according to the invention, demonstrated here, namely the scratch resistance, are independent of any heat treatment.

Finally, the invention relates to glazing comprising the article according to the invention. It may be, for example, a building or vehicle glazing.

The substrates according to the invention may be chosen from substrates:
- made of glass, advantageously silico-sodic-calcium glass,
- made of polymer, advantageously of polycarbonate, polymethyl methacrylate, polyethylene, polyethylene terephthalate or polyethylene naphthalate,
- made of metal, advantageously of steel, aluminum or copper, or made of ceramic, advantageously of silicon carbide, silicon nitride, aluminum nitride or aluminum oxide.

The transparent substrates according to the invention are preferably made of a rigid mineral material, such as glass, or organic material based on polymers (or made of polymer).

The glass is preferably of borosilicate, alumino-borosilicate or silico-sodic-calcium type, better still of silico-sodic-calcium type.

The transparent organic substrates according to the invention may also be made of rigid or flexible polymer. Examples of polymers that are suitable for use according to the invention especially comprise:
polyesters such as polyethylene terephthalate (PET), polybutylene terephthalate (PBT), polyethylene naphthalate (PEN);
polyacrylates such as polymethyl methacrylate (PMMA);
polycarbonates;
polyurethanes;
polyamides;
polyimides;
fluoro polymers, for instance fluoro esters such as ethylenetetrafluoroethylene (ETFE), polyvinylidene fluoride (PVDF), polychlorotrifluoroethylene (PCTFE), ethylenechlorotrifluoroethylene (ECTFE), and fluoro ethylene-propylene (FEP) copolymers;
photo-crosslinkable and/or photo-polymerizable resins, such as thiolene, polyurethane, urethane-acrylate or polyester-acrylate resins and
polythiourethanes.

Preferably, the substrate is a glass or vitroceramic sheet, or a sheet of a polymeric organic material. It is preferably transparent, colorless or colored.

The metal is preferably chosen from steel, aluminum and copper.

The ceramic is preferably chosen from silicon carbide, silicon nitride, aluminum nitride and aluminum oxide.

The thickness of the substrate generally ranges between 0.5 mm and 19 mm, preferably between 0.7 mm and 9 mm, especially between 2 mm and 8 mm, or even between 4 mm and 6 mm. The thickness of the substrate is preferably less than or equal to 6 mm, or even 4 mm. The substrate advantageously has a size of at least 50 cm.

Substrates made of polymeric organic material may have markedly smaller thicknesses, for example between 25 and 100 μm.

In the case of a glass substrate, it is preferably of the float type, i.e. it may have been obtained via a process consisting in pouring the molten glass onto a molten tin bath ("float" bath). The glass substrate may also be obtained by rolling between two rolls.

According to one embodiment, the article comprises a coating located between said protective layer and said substrate. The coating comprises at least one layer. The purpose of this or these layers is to give the substrate additional functionality. According to this embodiment, the article comprises a stack comprising the coating and at least one protective layer according to the invention.

The coating may comprise, starting from the substrate:
(i) at least one intermediate barrier layer,
(ii) optionally at least one wetting layer and
(iii) optionally at least one stack of low-emissivity layers and/or a stack of solar-control layers.

The invention also relates to an article comprising a transparent substrate, especially made of glass, coated with a stack of thin layers comprising:
at least one layer with infrared properties, especially a low-emissivity layer, arranged between (i) a subjacent wetting layer (which may be oxide-based), itself arranged on a first coating based on dielectric material and (ii) an optional upper blocking layer, itself surmounted with a second coating based on dielectric material and
at least one protective layer based on zirconium and aluminum mixed oxide and comprising.

BRIEF DESCRIPTION OF THE DRAWINGS

FIG. 6 represents the coefficient of friction for a protective layer of ZrOx :AlOx of Examples 13 a to 21a according to the invention deposited onto glass sheets, and FIG. 7 represents the coefficient of friction for a protective layer of ZrOx :AlOx of Examples 13b to 21b according to the invention deposited onto glass sheets.

In FIG. 1, the substrate 1 is optionally surmounted with a coating 2 constituted successively, starting from said substrate 1, of a layer 4 that acts as a barrier to the diffusion of oxygen and ions, among which Na+, of a wetting layer 5 and then of a low-emissivity stack (6) and/or of a solar-control stack (7), surmounted with a protective layer 3 based on zirconium and aluminum mixed oxide.

In FIG. 2, the substrate 1 is surmounted with a stack constituted successively, in the following order, (i) of a layer 4 that acts as a barrier to the diffusion of oxygen and Na+ ions, inter alia, (ii) of a wetting layer 5, (iii) of a functional layer 8 made of silver, (iv) of a blocking layer 9 also known as the "sacrificial" layer and then finally, again, (v) of a layer based on dielectric material 10, (vi) of an oxygen-barrier layer 11, (vii) surmounted with a protective layer 3 based on zirconium and aluminum mixed oxide.

These FIGS. 1 and 2 are very schematic and, for greater clarity, do not adhere to the proportions as regards the thicknesses of the various materials represented.

A protective layer 3 whose purpose is to protect the substrate 1 against scratches is deposited on said substrate, in direct contact therewith or otherwise. Specifically, a coating 2 may optionally be arranged on said substrate 1 so as to be between said substrate 1 and said protective layer 3. In this case, said protective layer 3 is the outermost layer of the stack arranged on said substrate, i.e. the layer that is the most remote from said substrate 1.

The article according to the invention thus comprises at least one transparent substrate 1, especially made of glass, at least one protective layer 3 and optionally a coating 2.

Figure 1:
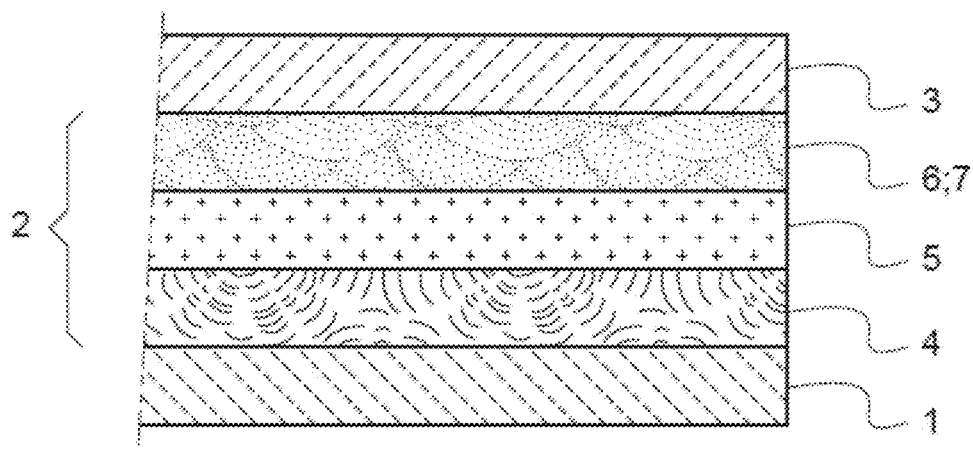
FIG. 1 is a view in cross section of one embodiment of an article coated according to the invention.

According to FIG. 1, this coating 2 comprises, starting from the substrate 1:
(i) at least one intermediate barrier layer 4,
(ii) at least one wetting layer 5 and
(iii) at least one stack of low-emissivity layers 6 and/or a stack of solar-control layers 7.

Figure 2:
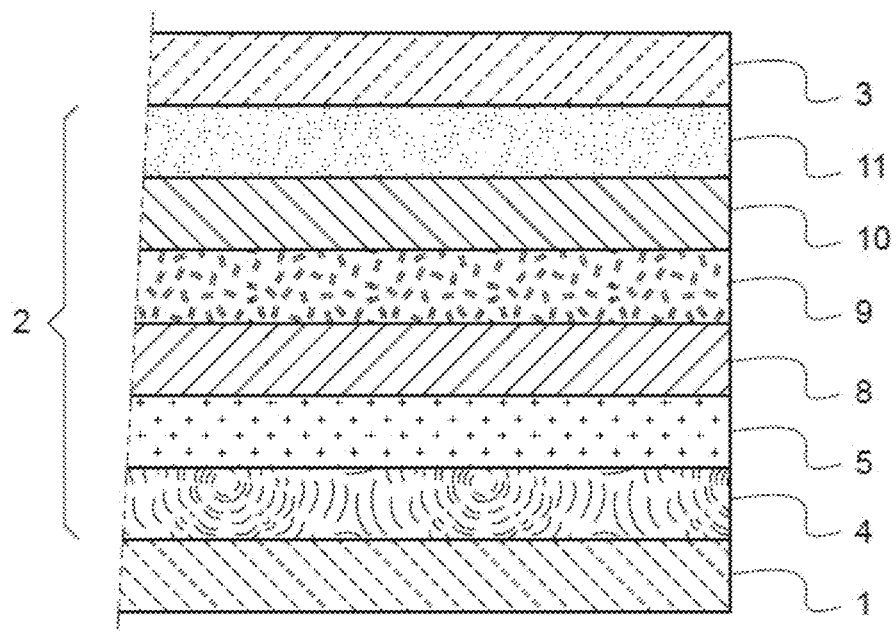
FIG. 2 is a view in cross section of another embodiment of an article coated according to the invention.

According to FIG. 2, the coating 2 comprises in greater detail, starting from the substrate 1, besides at least one intermediate barrier layer 4 and at least one wetting layer 5:
(i) at least one functional layer 8, in particular a metal layer with infrared properties, which is preferably silver-based,
(ii) optionally at least one blocking layer 9 also known as the "sacrificial layer", placed immediately over and in contact with said functional layer 8 with infrared properties,
(iii) at least one layer 10 of dielectric material that is not susceptible to substantial structural modification, especially of crystallographic order, at high temperature, and
(iv) at least one barrier layer 11 based on dielectric material, preferably based on a compound comprising silicon such as silicon nitride and aluminum nitride.

By way of illustration, stacks of layers in accordance with the invention may thus be of the type:
Glass//Si3N4 or AlN//ZnO/Ag/Nb//Si3N4//AlZrO or
Glass//Si3N4//ZnO/Ag/Nb//ZnO//Si3N4//AlZrO or
Glass//SiO2 or SiOxCy//ZnO/Ag/Nb//ZnO//Si3N4 or AlN//AlZrO or
Glass//SnO2//ZnO/Ag/Nb//Si3N4//AlZrO.

The invention thus allows the production of highly transparent, low-emissivity, toughenable and/or bendable, scratch-resistant articles. These properties, and especially the scratch resistance, are maintained virtually intact whether or not the substrates bearing said stacks are subjected, after deposition, to heat treatments such as bending, annealing or toughening. Very few colorimetric modifications are also observed, especially in terms of reflection.

A whole series of advantages follows therefrom: a single configuration of scratch-resistant stack of layers for each type of toughenable glazing, i.e. both toughened and non-toughened glazing.

It is also possible to assemble without preference, for example on a building facade, toughened and non-toughened glazings: the eye will not be able to detect differences in the overall optical appearance of the facade. It also becomes possible to sell non-toughened coated glazings, the act of toughening or not toughening them being left to the buyer's discretion, while at the same time being able to ensure said buyer of the consistency not only of their optical and thermal properties, but above all of their scratch resistance.

The articles according to the invention are able to be heat-treated, in particular by annealing, toughening and/or bending. However, whether or not they are bent, annealed or toughened, they have, by virtue of the invention, improved and consistent surface hardness relative to the prior art.

The article may be in the form of monolithic glazing, laminated glazing or multiple glazing, especially double glazing or triple glazing.

The protective layer based on zirconium and aluminum mixed oxide may be on faces 1, 2, 3 and/or 4 for laminated glazings comprising an intermediate PVB layer, located between face 2 and 3 of said glazing or on faces 1, 2, 3 and/or 4 of a multiple glazing, for example a double glazing comprising an air or gas space between face 2 and 3 of said glazing.

The article according to the invention finds particularly advantageous applications in the manufacture (i) of glazings, especially of windshields in the motor vehicle sector or of windows in the building sector, of mirrors,
(ii) of interior furnishing items, such as tables, counters, cooking hobs, shower walls, partitions, radiators, and wall coverings, such as facade coverings, inter alia.

The details and advantageous characteristics of the invention will now emerge from the following nonlimiting examples. Throughout the examples, the successive depositions of thin layers are performed via a magnetic-field-assisted cathode sputtering technique, but may also be performed via any other technique that allows good control of the layer thicknesses obtained.

The substrates onto which the stacks of thin layers are deposited are clear silico-sodic-calcium glass substrates of the Planilux® type, sold by SAINT-GOBAIN VITRAGE.

1. Measurement of the Coefficient of Friction

In the Examples and Comparative Examples that follow, the coefficient of friction was measured in the following manner:

A steel bead 10 mm in diameter is rubbed on glass (Comparative Example 1) or on a protective layer sputtered beforehand onto glass, in the other cases, with a constant load of 0.5N over a distance of 10 mm, the aim being to rub the surface of the glass or of the layer without degrading it. The test consists in performing a certain number of wear cycles (1 cycle=1 to-and-fro motion) defined below, at the same place and recording at each passage said coefficient and then calculating its mean value. After each test, the bead is turned in its bead holder so as to use a new surface in contact with the layer when the sample to be tested is changed.

COMPARATIVE EXAMPLE 1

A silico-sodic-calcium glass plate 2.1 mm thick is subjected to one or more wear cycles ranging from 2 to 10 cycles allowing the scratch resistance of the glass to be shown.

COMPARATIVE EXAMPLE 2

A protective layer of TiOx 20 nm thick is deposited by magnetron cathode sputtering onto a glass plate identical to that of Comparative Example 1. As previously, Comparative Example 2 is subjected to one or more wear cycles ranging from 2 to 10 cycles allowing the scratch resistance of the glass to be shown.

COMPARATIVE EXAMPLE 3

A protective layer of TiOx 20 nm thick is deposited by magnetron cathode sputtering onto a glass plate identical to that of Comparative Example 1. The glass plate thus coated is then subjected to a heat treatment at 640° C. for 10 minutes. As previously, Comparative Example 3 is subjected to one or more wear cycles ranging from 2 to 10 cycles allowing the scratch resistance of the glass to be shown.

Figure 3:
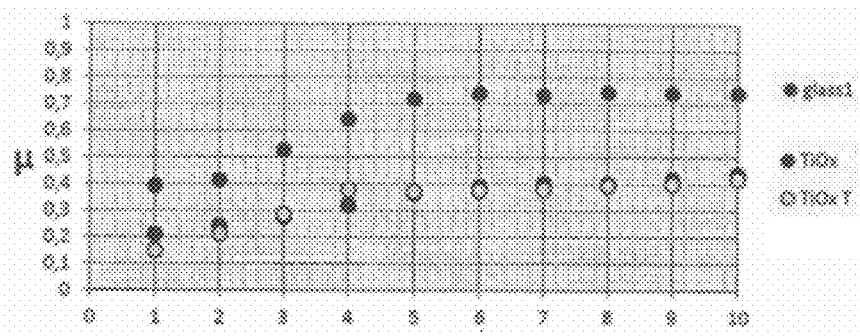
FIG. 3 represents the coefficient of friction as a function of the number of wear cycles.

The coefficient of friction measured is reported for each case in FIG. 3. FIG. 3 represents the coefficient of friction as a function of the number of wear cycles:
(i) for the naked glass (see the "glass1" points on the graph),
(ii) for a protective layer of 20 nm of TiOx deposited on a sheet of glass (see the "TiOx" points on the graph) and
(iii) for a protective layer of 20 nm of TiOx deposited on a sheet of glass, after heat treatment (see the "TiOx T" points on the graph).

The coefficient of friction measured for the naked glass is 0.7, whereas it is about 0.4 for the Comparative Examples with a titanium oxide protective layer, before or after toughening.

COMPARATIVE EXAMPLES 4a to 12a

A protective layer 20 nm thick of ZrOx:CuO, the Cu and Zr content of which is given for each Comparative Example 4a to 12a in table 1 below, is deposited by magnetron cathode sputtering, in particular by co-sputtering of zirconium oxide and copper oxide onto a glass plate identical to that of Comparative Example 1.

COMPARATIVE EXAMPLES 4b to 12b

As for the Comparative Examples 4a to 12a, a protective layer 20 nm thick of ZrOx:CuO, the Cu and Zr content of which is given for each Comparative Example 4b to 12b in table 1 below, is deposited by magnetron cathode sputtering, in particular by co-sputtering of zirconium oxide and copper oxide onto a glass plate identical to that of Comparative Example 1. The plates thus coated are then subjected to a heat treatment at 640° C. for 10 minutes.

Table 1 below gives not only the weight percentages of Cu and Zr, but also the resulting weight ratio Cu/Zr, of each Comparative Example 4a to 12a which did not undergo heat treatment, and of each Comparative Example 4b to 12b which underwent a heat treatment.

TABLE 1

| | Cp. Ex. | | | | | | | | |
|---|---|---|---|---|---|---|---|---|---|
| | 4 a or b | 5 a or b | 6 a or b | 7 a or b | 8 a or b | 9 a or b | 10 a or b | 11 a or b | 12 a or b |
| % Cu* | 3.1 | 3.8 | 4.8 | 5.4 | 7.3 | 8.6 | 11.9 | 13.8 | 15.8 |
| % Zr* | 96.9 | 96.2 | 95.2 | 94.6 | 92.7 | 91.4 | 88.1 | 86.2 | 84.2 |
| Cu/Zr | 0.03 | 0.04 | 0.05 | 0.06 | 0.08 | 0.09 | 0.14 | 0.16 | 0.19 |

*weight percentage relative to the total weight of Cu and Zr

Comparative Examples 4a to 12a and 4b to 12b are then subjected to 1, 4 or 15 wear cycles. The results are collated on the graphs of FIGS. 4 (without heat treatment) and 5 (after heat treatment).

Figure 4:
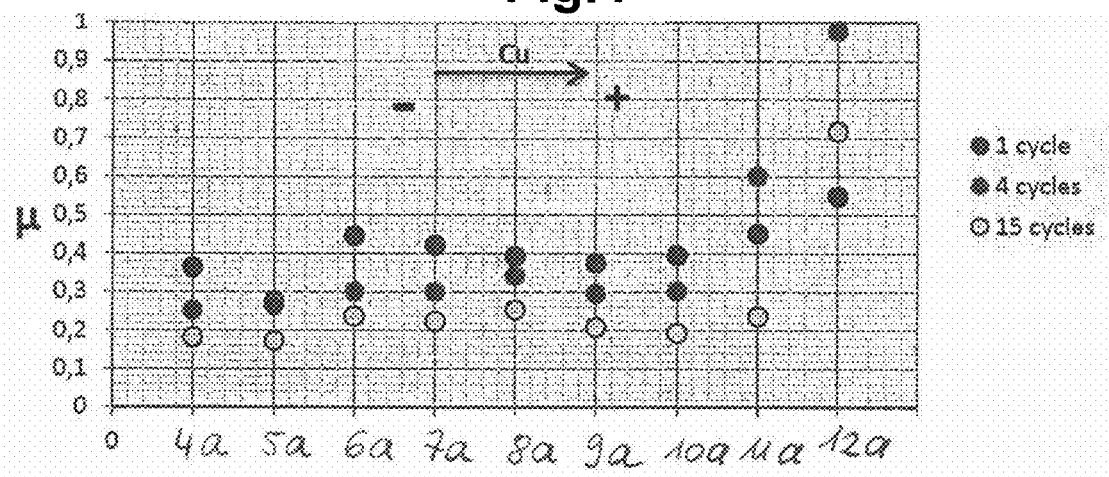
FIG. 4 represents the coefficient of friction for a protective layer of ZrOx:CuO of Comparative Examples 4a to 12a deposited onto glass sheets.

FIG. 4 represents the coefficient of friction for a protective layer of ZrOx:CuO of Comparative Examples 4a to 12a deposited onto glass sheets, said glass sheets thus coated having been subjected to 1, 4 or 15 wear cycles. The composition of Comparative Example 4a having the lowest content of Cu and the composition of Comparative Example 12a having the highest content of Cu of Comparative Examples 4a to 12a.

Figure 5:
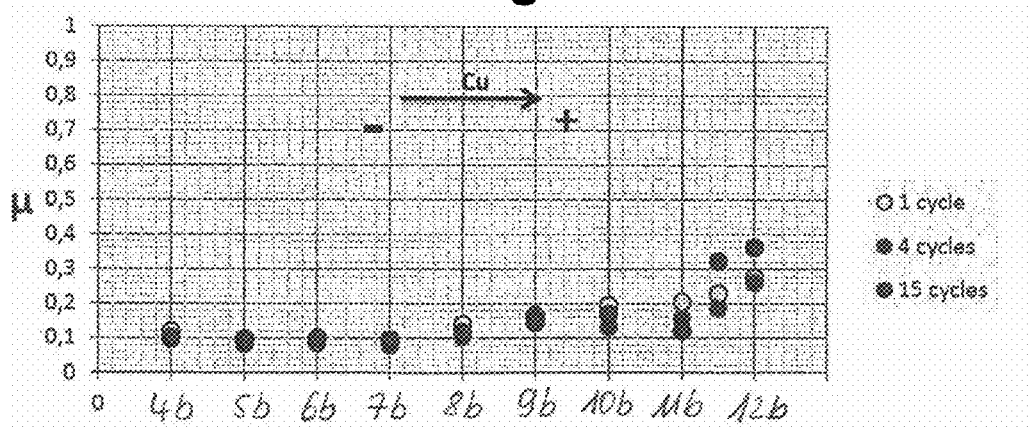
FIG. 5 represents the coefficient of friction for a protective layer of ZrOx :CuO of Comparative Examples 4b to 12b deposited onto glass sheets.

FIG. 5 represents the coefficient of friction for a protective layer of ZrOx:CuO of Comparative Examples 4b to 12b deposited onto glass sheets, said glass sheets thus coated having been subjected to a heat treatment before undergoing 1, 4 or 15 wear cycles. The composition of Comparative Example 4b having the lowest content of Cu and the composition of Comparative Example 12b having the highest content of Cu of Comparative Examples 4b to 12b.

In FIGS. 4 and 5, the arrow going from "−" to "+" indicates that the Cu content, in the protective layer of the comparative examples mentioned, increases in the direction indicated by the arrow.

For FIG. 4: It is seen that the doping with Cu of ZrOx has no influence on the coefficient of friction up to Comparative Example 10a (high doping with Cu). For the Comparative Examples that follow, on the other hand, the doping has a strong influence and the coefficient of friction increases very markedly to exceed 0.7.

For FIG. 5: The coefficients of friction for the layers of toughened ZrOx:Cu are smaller. Up to Comparative Example 8b, doping with copper has no influence on the coefficient of friction: said coefficient is constant at 0.1, even after 15 wear cycles. On the other hand, for the Comparative Examples that follow, doping with copper has an influence on the coefficient of friction values and a uniform increase which reaches 0.35 for Comparative Example 12b (the one which is the most strongly doped) is noted.

EXAMPLES 13a to 21a ACCORDING TO THE INVENTION

A protective layer 20 nm thick of ZrOx:AlOx, the Al and Zr content of which is given for each Example 13a to 21a in table 2 below, is deposited by magnetron cathode sputtering, in particular by co-sputtering of zirconium oxide and aluminum oxide onto a glass plate identical to that of Comparative Example 1.

The protective layer based on zirconium and aluminum mixed oxide does not comprise any elements other than nitrogen and oxygen.

EXAMPLES 13b to 21b ACCORDING TO THE INVENTION

As for Examples 13a to 21a, a protective layer 20 nm thick of ZrOx:AlOx is deposited by magnetron cathode sputtering, in particular by co-sputtering of zirconium oxide and aluminum oxide onto a glass plate identical to that of Comparative Example 1. The plates thus coated are then subjected to a heat treatment at 640° C. for 10 minutes.

Table 2 below gives:
the weight percentages of Al and Zr relative to the total weight of Al and of Zr in the Zr and Al mixed oxide, and
the resulting Al/Zr weight ratio, for each Example 13a to 21a, which has not undergone a heat treatment, and for each Example 13b to 21b, which has undergone a heat treatment.

The measurements are taken using a scanning electron microscope via the EDX method.

TABLE 2

| | Ex. | | | | | | | | |
|---|---|---|---|---|---|---|---|---|---|
| | 13 a or b | 14 a or b | 15 a or b | 16 a or b | 17 a or b | 18 a or b | 19 a or b | 20 a or b | 21 a or b |
| % Al** | 17.2 | 21.8 | 32.3 | 36.3 | 43.2 | 43.6 | 47.2 | 50 | 53.4 |
| % Zr** | 82.8 | 78.2 | 67.7 | 63.7 | 56.8 | 56.4 | 52.8 | 50 | 46.6 |
| Al/Zr | 0.21 | 0.28 | 0.48 | 0.57 | 0.76 | 0.77 | 0.89 | 1 | 1.15 |

**weight percentage relative to the total weight of Zr and Al.

Examples 13a to 21a and 13b to 21b are then subjected to 1, 4 or 15 wear cycles. The results are collated on the graphs of FIGS. 6 (without heat treatment) and 7 (after heat treatment).

FIG. 6 represents the coefficient of friction for a protective layer of ZrOx:AlOx of Examples 13a to 21a according to the invention deposited onto glass sheets, said glass sheets thus coated having been subjected to 1, 4 or 15 wear cycles. The composition of Example 13a having the lowest content of Al and the composition of Example 21a having the highest content of Al of Examples 13a to 21a.

FIG. 7 represents the coefficient of friction for a protective layer of ZrOx:AlOx of Examples 13b to 21b according to the invention deposited onto glass sheets, said glass sheets thus coated having been subjected to a heat treatment before undergoing 1, 4 or 15 wear cycles. The composition of Example 13b having the lowest content of Al and the composition of Example 21b having the highest content of Al of Examples 13b to 21b.

In FIGS. 6 and 7, respectively, the arrow going from "−" to "+" indicates that the Al content, in the protective layer of the examples mentioned, increases in the direction indicated by the arrow.

For FIG. 6: It is found that doping with Al has no influence on the coefficient of friction, which remains stable and low at 0.15.

For FIG. 7: the coefficient of friction is a little lower still and in the region of 0.1.

In the context of the invention, a low coefficient of friction of the order of 0.1 to 0.15 is observed, which is not influenced by the degree of doping with Al in the Zr and Al mixed oxide, whether or not a heat treatment is applied (see FIGS. 7 and 6), unlike the case of ZrOx:Cu (see FIGS. 4 and 5) and in all cases is much lower than the coefficient of friction measured for the naked glass or for the Comparative Examples with a protective layer of titanium oxide, before or after toughening (see FIG. 3).

2. Measurement of the Critical Damage Load

In the Examples and Comparative Examples that follow, the critical damage load Lc was measured in the following manner. A steel bead 1 mm in diameter is rubbed on glass (Comparative Example 1) or on a protective layer sputtered beforehand onto glass, in the other cases, with an increasing load of 0.03N and 30N at a loading rate of 15 N/minute over a scratch length of 10 mm, at a rate of movement of 5 mm/minute. Between each scratch, the bead is turned so as to renew the contact zone. Five scratches were performed each time to determine a mean critical load value Lc. The critical load Lc corresponds to the load at which the protective layer gives way.

| Examples | Lc (N) |
| --- | --- |
| Comp. Ex. 1 | 11.5 |
| Ex. 13a to 21a | >30 |
| Ex. 13b to 21b | >30 |
| Comp. Ex. 5a | 25 |
| Comp. Ex. 11a | 6 |
| Comp. Ex. 6b | 27 |
| Comp. Ex. 10b | 11 |
| Comp. Ex. 2 | 5 |
| Comp. Ex. 3 | 9 |

The critical load Lc is 11.5±3.2N for naked glass (Comparative Example 1).

The critical load Lc is greater than 30N, which is extremely high, for all the examples according to the invention (Examples 13a to 21a and 13b to 21b), irrespective of the content of Al in the Zr and Al mixed oxide, and whether or not they have undergone toughening. In addition, an absence of fissuring is observed for all the tests performed on the samples.

It is higher than the critical load of the Comparative Examples with a layer of ZrOx:Cu which has undergone toughening (Comparative Examples 4b to 12b) or which has not undergone toughening (Comparative Examples 4a to 12a). In general, the Lc lowers when the Cu doping in the ZrOx increases. It thus passes from 25N for Comparative Example 5a to reach 6N for Comparative Example 11a and it passes from 27N for Comparative Example 6b to reach 11N for Comparative Example 10b.

In the case of the Comparative Examples with a layer of TiOx which has not undergone a heat treatment (Comparative Example 2), the critical load Lc observed is only 5N, whereas it is 9N in the case of the Comparative Examples with a layer of TiOx which has undergone a heat treatment (Comparative Example 3). In this case, an effect of increasing the Lc by toughening is observed.

In conclusion, it is observed that the protective layer based on zirconium and aluminum mixed oxide according to the invention is the most efficient. Specifically, a critical damage load Lc of greater than 30N and a low coefficient of friction of 0.15 are obtained for the protective layer which has not undergone toughening and of 0.1 for the protective layer after toughening, irrespective of the aluminum content in the zirconium and aluminum mixed oxide.

The invention claimed is:

1. An article comprising a substrate that is transparent, said substrate being covered on at least one of its faces, totally or partly, with a protective layer based on zirconium and aluminum mixed oxide, wherein the Al/Zr atomic ratio in the zirconium and aluminum mixed oxide is between 0.05 and 0.5, wherein a thickness of the protective layer is between 1 and 50 nm.

2. The article as claimed in claim 1, wherein the protective layer based on zirconium and aluminum mixed oxide is the layer that is the most remote from the substrate.

3. The article as claimed in claim 1, wherein the Al/Zr atomic ratio in the zirconium and aluminum mixed oxide is between 0.05 and 0.4.

4. The article as claimed in claim 3, wherein the Al/Zr atomic ratio in the zirconium and aluminum mixed oxide is between 0.1 and 0.4.

5. The article as claimed in claim 4, wherein the Al/Zr atomic ratio in the zirconium and aluminum mixed oxide is between 0.2 and 0.3.

6. The article as claimed in claim 1, wherein the atomic proportions of aluminum and zirconium in the protective layer relative to the proportions of all the elements other than oxygen and nitrogen are greater than 50%.

7. The article as claimed in claim 1, wherein the mass proportions of aluminum in the protective layer relative to the mass proportions of all the elements other than oxygen and nitrogen present in the protective layer are greater than 10% and less than 60%.

8. The article as claimed in claim 1, wherein the mass proportions of zirconium in the protective layer relative to the mass proportions of all the elements other than oxygen and nitrogen present in the protective layer are greater than 40% and less than 90%.

9. The article as claimed in claim 1, wherein a thickness of the protective layer is between 5 and 35 nm.

10. The article as claimed in claim 1, further comprising a coating located between said protective layer and said substrate.

11. The article as claimed in claim 1, wherein the substrate is coated with a stack of thin layers comprising at least one functional layer and said at least one protective layer based on zirconium and aluminum mixed oxide.

12. The article as claimed in claim 11, wherein the protective layer based on zirconium and aluminum mixed oxide is located over the functional layer.

13. The article as claimed in claim 11, wherein the stack of thin layers comprises at least one silver-based functional metal layer, at least two coatings based on dielectric materials, each coating comprising at least one dielectric layer, such that each functional metal layer is arranged between two coatings based on dielectric materials.

14. The article as claimed in claim 11, wherein the at least one functional layer is metallic.

15. The article as claimed in claim 1, such that the transparent substrate is:
   made of glass, or
   made of polymer.

16. The article as claimed in claim 15, wherein the glass is silico-sodic-calcium glass, and wherein the polymer is polycarbonate, polymethyl methacrylate, polyethylene, polyethylene terephthalate or polyethylene naphthalate.

17. The article as claimed in claim 1, wherein the article is heat treated.

18. The article as claimed in claim 17, wherein the article is heat treated by annealing, toughening and/or bending.

19. A glazing for a vehicle or glazing for a building, or glazing included in the composition of a table, a counter, a cooking hob, a shower wall, a partition or a radiator, comprising an article as claimed in claim 1.

20. A process for manufacturing an article that includes a substrate that is transparent, said substrate being covered on at least one of its faces, totally or partly, with a protective layer based on zirconium and aluminum mixed oxide, wherein the Al/Zr atomic ratio in the zirconium and aluminum mixed oxide is between 0.05 and 0.5, wherein a thickness of the protective layer is between 1 and 50 nm, the method comprising depositing said protective layer based on zirconium and aluminum mixed oxide:
   (i) by magnetron cathode sputtering, or
   (ii) by chemical vapor deposition using a suitable precursor based on zirconium and aluminum, or
   (iii) by gas-phase pyrolysis under ambient pressure.

21. The process as claimed in claim 20, wherein said protective layer is deposited by co-sputtering of zirconium oxide and aluminum oxide or by reactive sputtering using a target of zirconium and aluminum in the presence of $O_2$, or a mixed target of zirconium and aluminum oxide.

* * * * *